UNITED STATES PATENT OFFICE.

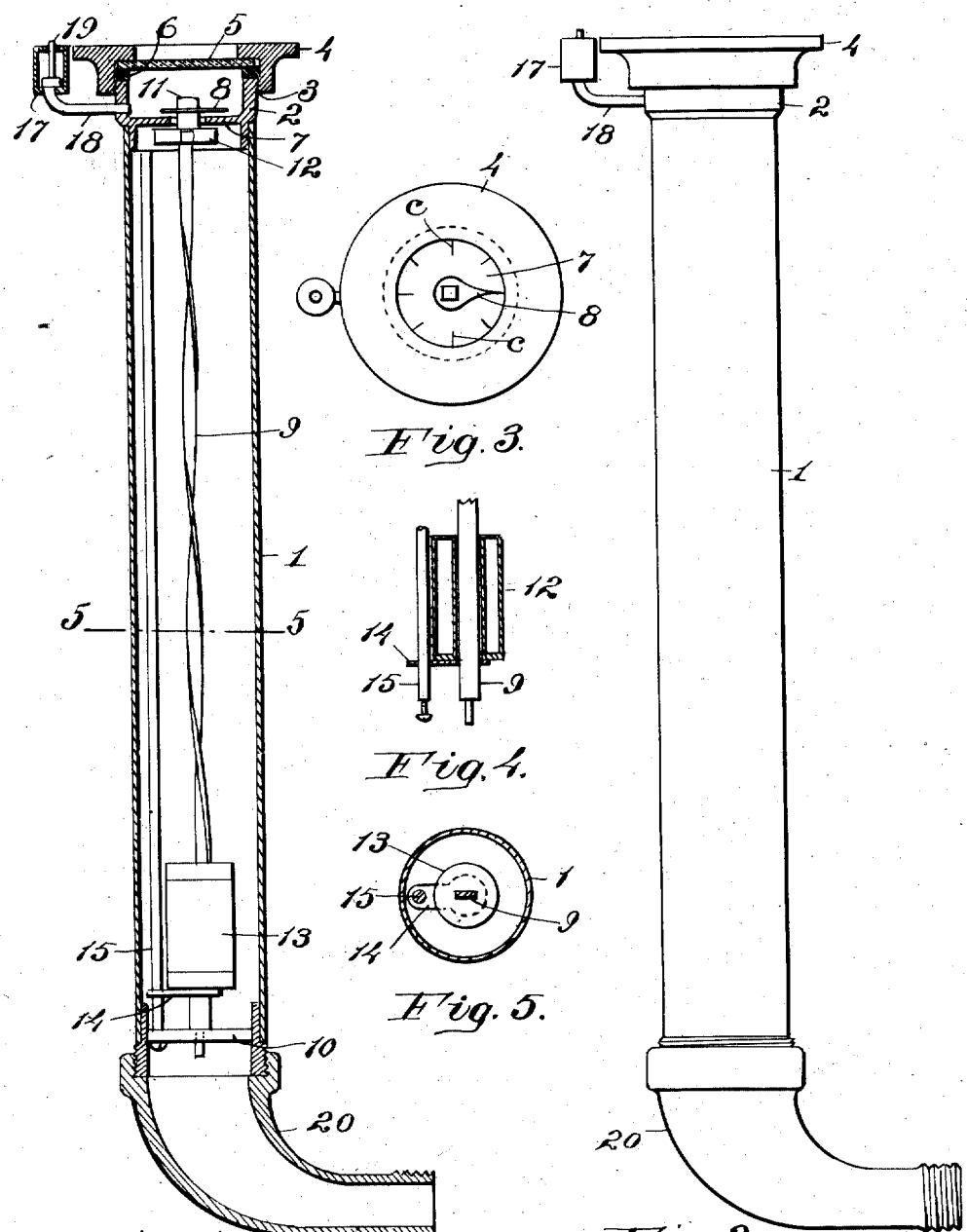

HARRY CHARLES METZGER, OF LOS ANGELES, CALIFORNIA.

GAGE.

994,770.  Specification of Letters Patent.  Patented June 13, 1911.

Application filed April 15, 1910. Serial No. 556,882.

*To all whom it may concern:*

Be it known that I, HARRY CHARLES METZGER, of the city and county of Los Angeles, State of California, have invented certain new and useful Improvements in Gages, of which the following is a specification.

My invention relates to gages for automatically showing the quantity of liquid contained in a vessel, such as, for instance, oil, spirituous liquor, and the like, which are so located that they cannot be inspected by the eye, and applicable to all vessels which are so closed that the contents cannot be observed from the exterior; and the object is to enable a person to ascertain the height of the liquid in the vessel or to determine the quantity therein at any time. One of its uses is the application thereof to automobiles whereby the driver may be able to determine, at a glance the distance which he can travel by inspecting the indicator.

In the annexed drawings, Figure 1 is a vertical section showing certain parts in elevation, of my improved gage. Fig. 2 is a side view of the gage. Fig. 3 is a top view of the gage. Fig. 4 is a vertical section of the operating float. Fig. 5 is a horizontal section of the gage on line 5 of Fig. 1.

The casing of the gage is indicated by 1, which is in the form of a cylindrical shell, and to the top thereof is secured permanently a metallic screw fitting 2, the upper part of which is externally threaded, as at 3, and upon which the internally-threaded cap 4 is placed. The interior of the cap 4 is formed with a recess in order to receive the rim portion of the glass 5. An india rubber band 6 rests upon the top of the fitting 2 and constitutes a cushion for the glass. The plate 7 is fixed into the fitting 2, and its upper surface is divided into any required number of divisions, as shown at $c$, Fig. 2, to indicate quantities, and the position at which the pointer 8 stands, in relation to these divisions, indicates the quantities expressed in liquid measure which are contained in the tank to which the invention is applied. Centrally within the shell is a spiral shaft 9, having a bearing at its lower end in a cross bar 10, and its upper end rests loosely in head 11 revoluble with shaft 9, which is mounted in the dial plate 7, the upper end of the head having the pointer 8, and below the dial plate a cork disk or valve 12. This shaft passes through a float 13, so that the latter moves loosely on the shaft. The lower end of the float has a laterally-projecting arm 14, with a hole in its outer end, through which hole is a vertical fixed rod 15 secured at its upper and lower ends so that it is parallel with the spiral shaft 9, and as the arm 14 is adapted to freely move on the rod the float is prevented from turning as it moves up and down on the spiral shaft. The result is that the spiral shaft 9 is turned and the pointer 8 is thus caused to traverse the dial. It should be observed that the spiral shaft is so made that as the float moves up the latter will give one complete turn to the shaft.

The particular object in making the revoluble head 11 separate from the spiral shaft 9, is to provide a positive closure of the valve 12 against the dial plate, in the event there should be any inclination of the shell, or the liquid in the tank should rise too high, thereby preventing the liquid from escaping. It is also necessary to have the head 11 movable vertically a limited distance so as to exclude air from or admit air to the shell, Fig. 1, as the liquid therein rises and falls. A check valve 17 is located at the upper end of the shell, which has a tube 18 leading to the chamber above the dial plate, the check valve being adapted to automatically open and discharge air as the liquid rises in the shell 1, but when the liquid in the shell falls then the check valve will seat itself and prevent an inflow of air, unless the valve is raised by its stem 19. The lower end of the shell has a curved removable nozzle 20, by means of which it may be attached to a tank.

The operation of the gage is as follows: When the tank, containing the liquid, is filled, the float is at its highest point, and as the liquid is withdrawn and a sufficient amount of air is permitted to pass in through the check valve 17, the float will move down, thus turning the spiral shaft 9 and carrying the pointer 8 with it, indicating the quantity of the liquid or the height of the liquid in the tank.

As it is desirable in the case of certain liquids to exclude air as much as possible, the check valve 17 provides for keeping out air while the liquid in the tank is being withdrawn, until the user raises the valve stem 18, and thus, also, by suddenly admitting air there will be a tendency, in the event the valve 12 should stick, to force it away from its seat.

What I claim as new, is:—

1. In a gage, a vertical shell having means for attaching the lower end to a tank, means within to indicate the level of the liquid in the shell, a check valve at the upper end of the shell to discharge air as the shell receives liquid, and a valve below the check valve adapted to check the outflow of air as the liquid rises within the shell.

2. A gage, comprising a vertical shell, having means at its lower end for attaching same to a tank, a removable head at its upper end having therein a dial and a visual glass above the same, a spiral shaft within the shell having a revoluble head, vertically-movable, to which the upper end of said shaft is secured to provide for a slight vertical movement, said head having a finger above the dial plate, and a valve disk below the dial plate, and a check valve for admitting air to the chamber between the visual glass and dial plate.

3. A gage, comprising a vertical shell, having a removable nozzle at its lower end and a removable cap at its upper end, said cap having a visual glass, and a dial plate below the glass, a vertically-movable head revolubly mounted in the dial plate, having a pointer on its end above the dial plate and a valve below the dial plate, said cap having a vent to admit air to the chamber formed between the visual glass and dial plate, a vertical spiral shaft having its upper end secured to the revoluble head to provide for a slight vertical movement, a vertically-movable float in the shell engaging with the spiral shaft to turn the same when the float rises and falls, an arm projecting from one side of the float, and a guide rod parallel with the spiral shaft which passes loosely through the arm to prevent the turning of the float.

In testimony whereof, I have hereunto set my hand and seal, in the presence of two subscribing witnesses.

HARRY CHARLES METZGER. [L. S.]

Witnesses:
St. John Day,
Ethel Laurain Metzger.

---

Copies of this patent may be obtained for five cents each, by addressing the "Commissioner of Patents, Washington, D. C."